Dec. 22, 1959 D. H. MASH 2,918,582

COMBINED ELECTRO-LUMINESCENT AND PHOTO-CONDUCTIVE DEVICES

Filed Aug. 14, 1957

INVENTOR
DEREK HUBERT MASH
BY Lawrence Burns
ATTORNEY

United States Patent Office 2,918,582

Patented Dec. 22, 1959

2,918,582

COMBINED ELECTRO-LUMINESCENT AND PHOTO-CONDUCTIVE DEVICES

Derek Hubert Mash, London, England, assignor to Thorn Electrical Industries Ltd.

Application August 14, 1957, Serial No. 678,212

Claims priority, application Great Britain August 28, 1956

8 Claims. (Cl. 250—213)

Figure 1:
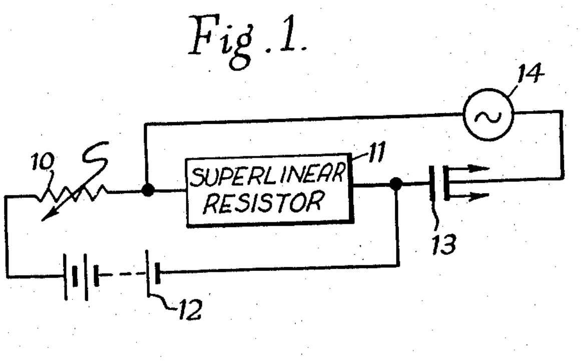

The present invention relates to combined electroluminescent and photo-conductive devices. In such devices variations in resistance of photo-conductive material produced by variations in the intensity of light falling thereon are arranged to cause variations in light emitted by electro-luminescent material.

The photo-conductive and electro-luminescent elements are usually connected in series across a source of alternating current, since an alternating (or at least a fluctuating) voltage is needed to operate the electroluminescent element, and this arrangement has a number of disadvantages, including the following:

(*a*) The photo-conductive material has to operate on alternating current with which many materials, for instance cadium sulphide, are not so sensitive as they are with direct current.

(*b*) If the photo-conductive layer is very thin it may offer a capacitive path to alternating current which has an impedance comparable with the resistance of the layer, and the effect of changes in the resistance with illumination is then reduced.

(*c*) Some photo-conductive materials have a rectifying action, the increase in current produced by illumination being greater in one direction than in the other. This reduces the efficiency when alternating current is used as compared with direct current.

(*d*) All the current required for operating the electro-luminescent element has to pass through the photo-conductive element. This means that the power rating of the photo-conductive element must be equal to that of the electro-luminescent element, and this restricts scope in design and in some cases may not be possible to arrange in a practical device.

(*e*) The impedances of the photo-conductive and electro-luminescent elements have to be carefully matched in order to obtain good results and this is often impossible without reducing the sensitivity of the photo-conductive element below what it otherwise could be.

The present invention has for its object to provide an improved device embodying photo-conductive and electroluminescent elements in which one or more of the disadvantages referred to are overcome or at least substantially reduced. According to the present invention a combined electro-luminescent and photo-conductive device comprises a super-linear resistor and a circuit interconnecting an electro-luminescent element, a photo-conductive element, the super-linear resistor and sources of alternating and direct voltage and such that at least a part of the alternating current from the alternating voltage source is prevented from traversing the photo-conductive element and at least a part of the direct current from the direct voltage source is prevented from traversing the electro-luminescent element.

By a super-linear resistor is meant a resistive device in which the current varies as a power greater than unity of the voltage applied thereto. An example is, silicon carbide powder bonded by a suitable binder.

In a preferred embodiment, the two sources, the two elements, and the super-linear resistor are all connected in series, and means are provided for by-passing a substantial part of the alternating current around the photo-conductive element and a substantial part of the direct current around the electro-luminescent element.

In another arrangement according to the invention, means are provided for applying the direct voltage across the photo-conductive element in series with the super-linear resistor, and for applying the alternating voltage across the electro-luminescent element in series with the superlinear resistor.

The photo-conductive element, the super-linear resistor, and the electro-luminescent element may each be in the form of a thin layer. These layers may be superimposed, in the order named between light-transmitting, electrically conducting layers, all these layers being carried upon a suitable transparent support. Sources of direct and alternating voltage may be connected in series between the conducting layers.

Figure 2:
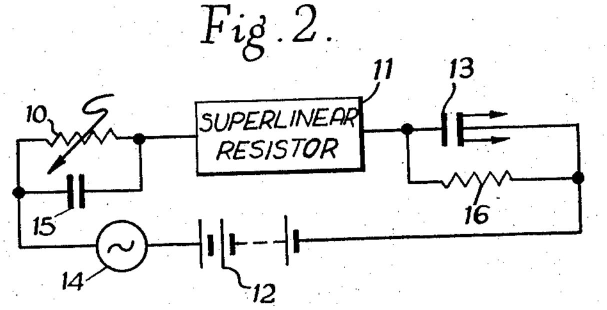
Figure 3:
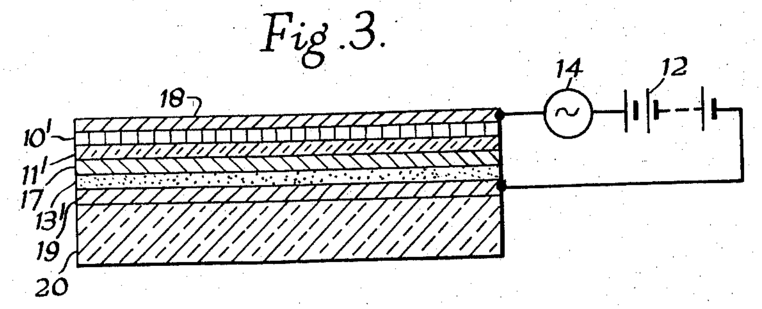

The invention will be described by way of example, with reference to the accompanying drawing, in which Figures 1 and 2 are circuit diagrams of two embodiments of the invention, and Figure 3 is a diagrammatic view in section of a structure that may be used in the circuit of Figure 2.

Referring to Figure 1, a photo-conductive element 10 is connected in series with a super-linear resistor 11 across a source 12 of direct voltage. The super-linear resistor 11 is connected in series with an electro-luminescent element 13 across a source 14 of alternating voltage.

In operation, when the photo-conductive element 10 is exposed to light its resistance falls and the electric field across the super-linear resistor 11 increases, thereby decreasing the resistance thereof. The alternating current from the source 14 passing through the super-linear resistor 11 and the electro-luminescent element 13 therefore increases.

With this circuit it can be arranged that little direct current passes through the electro-luminescent element 13 and little alternating current passes through the photo-conductive element 10. If desired this effect can be increased by inserting a capacitor in series in the direct connection between the source 14 and the electro-luminescent element 13, and/or by connecting an inductor or a resistor in parallel with the element 13. Similarly an inductor may be connected in series in the direct connection between the source 12 and the photo-conductive element 10 and/or a capacitor may be connected in parallel with this element.

In the embodiment of Figure 2 like parts have the same references as in Figure 1. In this example the elements 10 and 13 and the super-linear resistor 11 are connected in series across the two sources 12 and 14 in series. The flow of alternating current through the photo-conductive element 10 is substantially avoided by providing a by-pass capacitor 15 of suitable capacitance in parallel with this element. The flow of direct current through the electro-luminescent element 13 is greatly reduced by a bypass resistor 16 connected in parallel with this element.

The capacitor 15 may be replaced wholly or in part by capacitance introduced into the photo-conductive element, for example by mixing the photo-conductive material with a material of high permittivity, or it may be provided by the capacitance between electrodes of the photo-conductive element, where the photo-conductive layer is thin enough. The resistor 16 may be dispensed with by mixing a material of suitable conductivity with the electro-luminescent material, thereby rendering the electro-luminescent element suitable conducting.

With the embodiments described the disadvantages (*a*) to (*d*) hereinbefore referred to can be substantially avoided. Regarding the disadvantage (*e*), the embodiments of Figs. 1 and 2 give much wider scope for design than the known arrangements referred to and this disadvantage is, therefore, substantially reduced.

In this case, as in a light amplifier, where each of a large number of photo-conductive elements is required to control a different one of a corresponding number of electro-luminescent elements, the structural form of Figure 2 shown in Figure 3 may be used. The photo-conductive and electro-luminescent elements are in the form of thin layers 10' and 13' respectively (shown greatly exaggerated in thickness) and the super-linear resistor is in the form of a thin layer 11'. These three layers may in some cases be superimposed in contact with one another but for a light amplifier, as shown, a layer 17 of light-reflecting material is interposed to prevent light from the electro-luminescent layer 13' from reaching the photo-conductive layer 10'. Transparent electrically-conducting layers 18 and 19 are provided as shown and the whole is supported upon a glass or other transparent support 20.

With the arrangement of Fig. 3 the intensity of illumination, and hence the resistance, of each elemental area of the photo-conductive layer 10' controls the field strength across the corresponding elemental area of the electro-luminescent layer 13'. Hence an image may be cast upon the layer 18 and an image of greater intensity is then visible through the glass support 20.

I claim:

1. A combined electro-luminescent and photo-conductive device comprising a super-linear resistor, an electro-luminescent element, a photo-conductive element, electrodes for applying an electric field in said electro-luminescent element, terminals for connection to alternating and direct voltage sources, and circuit means interconnecting said terminals, said electrodes, said super-linear resistor and said photo-conductive element and passing through said photo-conductive element only a part of the alternating current passing from said alternating voltage source through said terminals and passing through said electro-luminescent element only a part of the direct current passing from said direct voltage source through said terminals.

2. A combined electro-luminescent and photo-conductive device comprising a super-linear resistor, an electro-luminescent element, a photo-conductive element, electrodes for applying an electric field in said electro-luminescent element, terminals for connection to an alternating and a direct voltage source connected in series, said super-linear resistor, said electrodes, and said photo-conductive element being connected in series between said terminals, first means by-passing at least a substantial fraction of alternating current from said terminals around said photo-conductive element, and second means by-passing at least a substantial fraction of direct current from said terminals around said electro-luminescent element.

3. A device according to claim 2, wherein said first by-passing means comprise capacitance introduced into the photo-conductive material of said photo-conductive element.

4. A device according to claim 2, wherein said second by-passing means comprise conducting material introduced into the electro-luminescent material of said electro-luminescent element.

5. A combined electro-luminescent and photo-conductive device comprising a super-linear resistor, an electro-luminescent element, a photo-conductive element, electrodes for applying an electric field in said electro-luminescent element, terminals for connection to an alternating current source, and terminals for connection to a direct current source, said electrodes and said super-linear resistor being connected in series between the first-named terminals and said photo-conductive element and said super-linear resistor being connected in series between the second-named terminals.

6. A device according to claim 1, wherein said photo-conductive element, said super-linear resistor and said electro-luminescent element are all in the form of thin layers.

7. A device according to claim 6 comprising two light-transmitting, electrically-conducting layers constituting said electrodes and having disposed between them in the order named said photo-conductive element, said super-linear resistor and said electro-luminescent element.

8. A device according to claim 7, comprising an opaque layer disposed between said electro-luminescent layer and said photo-conductive layer.

References Cited in the file of this patent

"Photoconductive Films," Quarterly Report No. 6, second series of the Computer Component Fellowship No. 347, Mellon Institute of Industrial Research, Jan. 1, 1955, to March 31, 1955.

"Principles of the Light, Amplifier and Allied Devices," by Tomlinson, Journal of the British I.R.E., March 1957, pages 141–154.